Nov. 25, 1930.  J. M. G. FULLMAN  1,782,779
FITTING FOR ELECTRICAL CONDUIT SYSTEMS
Filed May 15, 1929  2 Sheets-Sheet 1
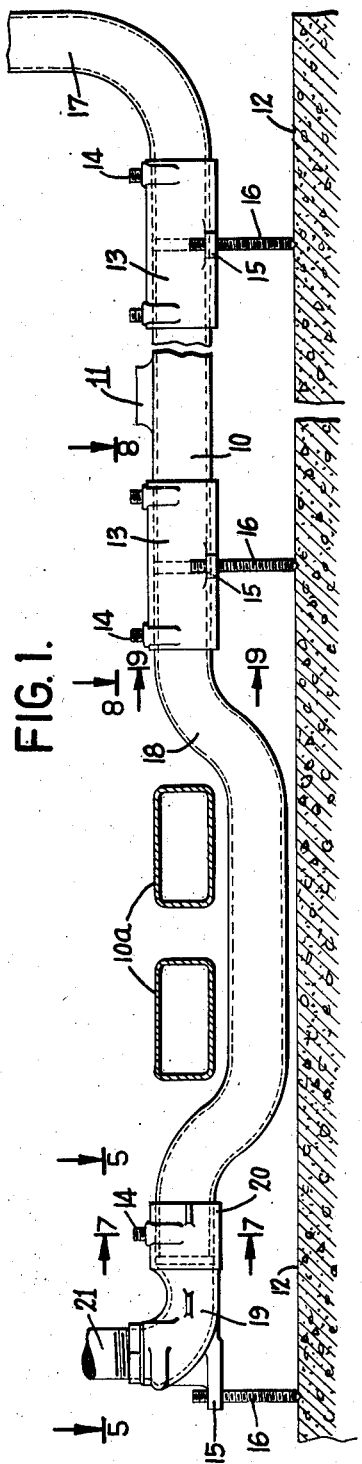
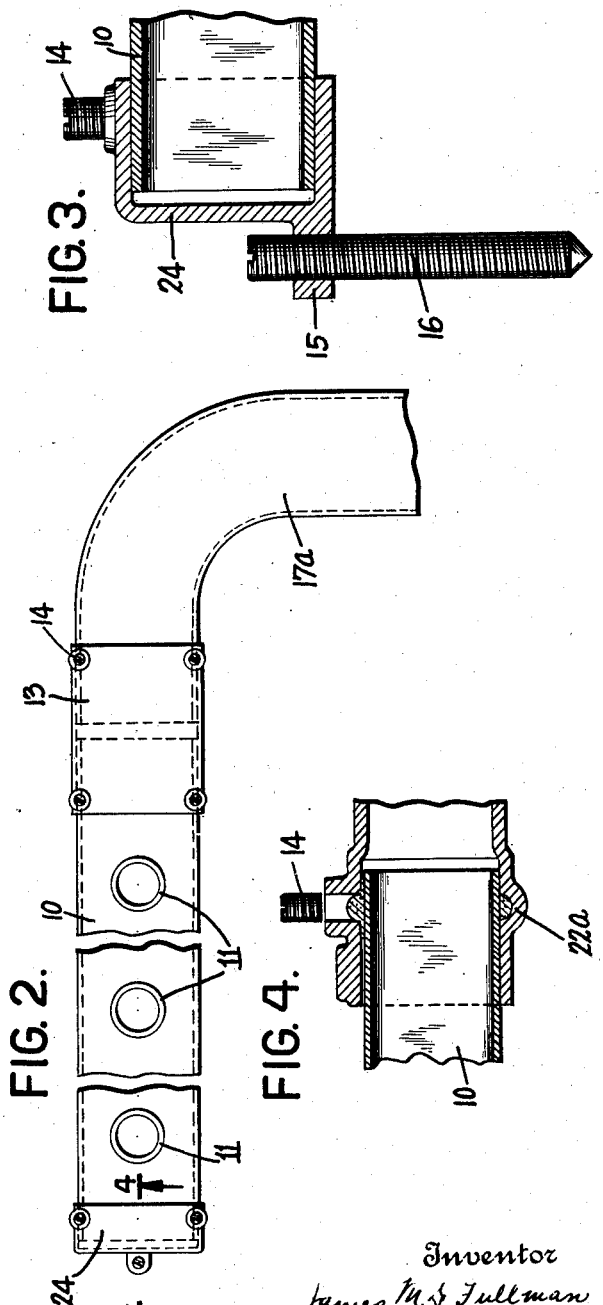
Inventor
James M. G. Fullman
By his Attorneys
Cooper, Kerr & Dunham

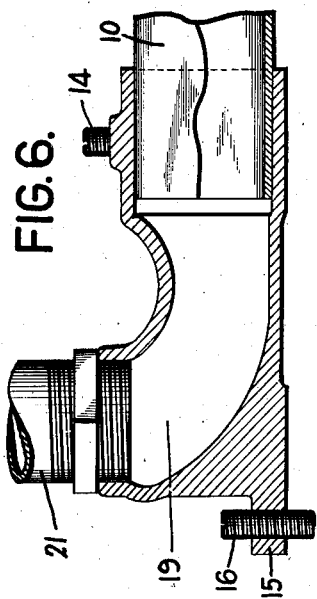
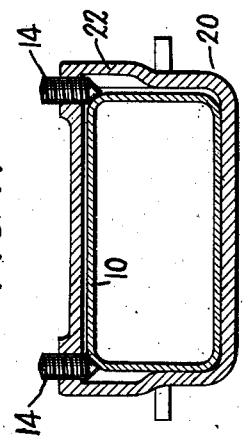
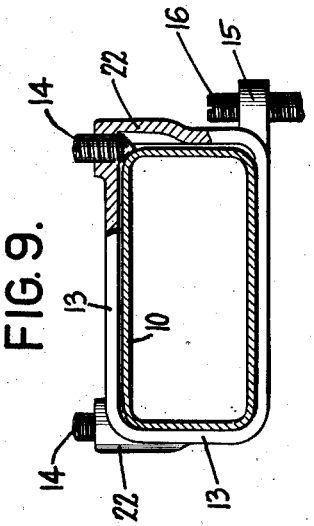
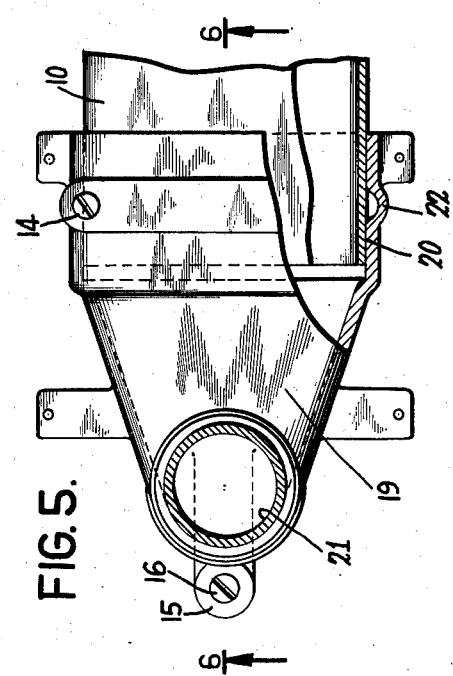
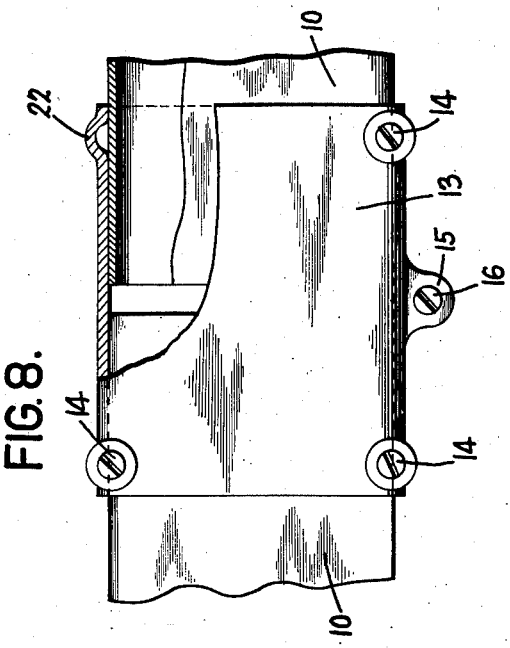

Patented Nov. 25, 1930

1,782,779

UNITED STATES PATENT OFFICE

JAMES M. G. FULLMAN, OF SEWICKLEY, PENNSYLVANIA, ASSIGNOR TO NATIONAL ELECTRIC PRODUCTS CORPORATION, OF NEW YORK, N. Y., A CORPORATION OF DELAWARE

FITTING FOR ELECTRICAL-CONDUIT SYSTEMS

Application filed May 15, 1929. Serial No. 363,121.

This invention relates to fittings for duct systems and more particularly relates to fittings adapted for use with an underfloor duct system which is generally of the type shown and described in the co-pending application of W. C. Robinson, Serial No. 338,667, filed February 9, 1929.

In the installation of so-called underfloor duct systems it is the practice to first lay the main floor slab or base and then to install thereon the duct system for electrical distribution. The ducts are spaced slightly from and levelled with respect to the main slab and subsequently the ducts are covered with concrete. Frequently one duct must be connected with another and in some cases blind ends of ducts must be sealed off and in other cases elbow connections must be made from ducts running in one direction to other ducts which run at right angles thereto. Sometimes the disposition of the ducts is such that certain duct runs must cross other ducts.

With all of such systems, it is desirable that installation steps be simplified as much as possible and that a conduit or duct may be rapidly and firmly connected to a fitting and furthermore it is desirable that the relation of the ducts, fittings and the like to the floor slab and particularly the spacing of such parts therefrom, may be rapidly established and maintained until the concrete has been filled over and set around the duct system.

The system of fittings herein described are of particular utility in systems of this class.

One object of the present invention resides in the provision of duct connectors, elbows, blind end closures and other like fittings which are provided with means of novel form for fastening adjacent duct sections thereto.

Another object of the present invention resides in the provision in fittings of the type just specified, of means for supporting such fittings at an adjustable height above the main floor slab.

Another object of the present invention resides in the provision of novel means for uniting adjacent duct sections or fittings or ducts and fittings with a connection of such character that a good ground circuit can be established from part to part.

Further and other objects of the invention will be hereinafter set forth in the accompanying specification and claims and shown in the drawings, which by way of illustration show preferred embodiments of the invention.

In the drawings:

Figure 1 is a side elevational view of a portion of a duct system embodying certain of my improved fittings and showing the system and fittings in relation to a main supporting slab;

Fig. 2 is a plan view of the fragment of a duct system wherein a different form of elbow is employed and which shows a cap for a blind end of a duct;

Fig. 3 is a detail sectional view of the blind end duct cap taken on line 4—4 of Fig. 2;

Fig. 4 is a detail of one form of connecting means for ducts and fittings with provisions for sealing the fitting against the entrance of moisture;

Fig. 5 is a top plan view of one of the elbow fittings shown in Fig. 1, it being taken substantially on line 5—5 of Fig. 1, but with certain parts broken away to show the interior construction;

Fig. 6 is a detail sectional view taken on line 6—6 of Fig 5;

Fig. 7 is a detail sectional view taken on line 7—7 of Fig. 1;

Fig. 8 is a top plan view of a connection fitting taken on line 8—8 of Fig. 1 with certain parts broken away to show the interior construction;

Fig. 9 is a detail sectional view taken on line 9—9 of Fig. 1 and with certain parts broken away in section to show the construction.

The duct is preferably a metal duct having a substantially rectangular configuration and with rounded corners and such duct is shown at 10 in Fig. 7. This duct is provided at intervals with integral outlet necks 11, see Figs. 1 and 2.

It will be understood that numerous lengthy sections of such duct are used having the integral outlets 11 and that from time to time it is necessary and desirable to connect up such duct sections with other sections and other fittings, elbows and the like.

Referring again to Fig. 1, 12 indicates the main or sub-supporting slab of concrete. Also fitted to the duct 10 at each end is a connection or coupling fitting 13. Such coupling fitting is substantially shaped in cross-section as shown in Fig. 9 and is provided with tapped openings, to receive set screws such as 14. These set screws when tightened up, clamp the curved corner portions of the rectangular duct which has been telescoped therein and thus serve to firmly hold the adjacent duct sections or fittings in position.

By providing each of the set screws 14 with a suitable end wedging portion, preferably the conical end as shown and by having such set screws so disposed in the fitting in the extensions 22 as to cooperate with the curved corner portions of the conduit when the set screw or screws are advanced, the tightening of the set screw causes the screw to tilt in its threaded hole thus causing it to bind and prevent its subsequently working loose. This construction permits a loosely fitted screw to act with all the advantage of a tightly fitted one and also facilitates assembly of the parts.

The construction also affords a good ground connection between a fitting and duct when the screw is tightened.

While the set screw is shown in cooperation with the rounded corner of a substantially rectangular duct, it is obvious that similar advantageous results can be secured with round duct by disposing the set screw off center with respect to the duct or conduit.

Similar advantageous results may also be secured with ducts having relatively square corners, by so disposing the set screws that their wedging portions bear relatively edgewise upon the square corners.

As a means for supporting the coupling at a proper and adjustable height above the main slab 12, the coupling 13 is provided with an extended portion 15 which is tapped to receive a threaded stud 16. This stud is provided with a screw slot at its upper end and by adjusting this stud up and down, the coupling and the ducts which are telescoped therein can be adjusted to any desired height above the floor level of the slab 12. Extending out from the right end of coupling 13 in Fig. 1, and sweeping upwardly therefrom is a metallic curved elbow conduit section 17. Extending to the left from the left hand coupling 13 there is shown a section of conduit 18 having the proper configuration to enable the same to dip below cross ducts $10^a$ which are shown above it in section. At the end of section 18, I have shown an elbow fitting 19 of a different sort. This elbow fitting 19 is provided with a female coupling section 20 having the set screws 14 therein disposed in a similar manner to the set screws 14 which have previously been described in connection with Fig. 7. The fitting 19 likewise has the extension 15 thereon receiving set screw 16 to provide for adjustment of height and support of such fitting above the level of the slab 12 (see Figs. 5 and 6). Such fitting as 19 it will be understood, can be arranged to receive a round conduit such as 21. Preferably in order that the various fittings, couplings and the like have their set screws in proper relation to the ducts which are telescoped therein, these various fittings are provided with slightly flared-out portions as indicated at 22 in the various figures.

Referring now to Figs. 2 and 3, the section of conduit 10 is shown as having at its right hand end a female coupling 13 which in turn receives a conduit section $17^a$. This section $17^a$ is an elbow section having its elbow in the plane of the conduit in place of bending out of the plane of the conduit as is the case with section 17 in Fig. 1. The conduit 10 is also shown as having one end sealed off by a so-called duct end blank part 24. Such duct end blank part likewise is provided with the set screw 14 and with the extension 15 which is adapted to receive a stud 16.

In Fig. 4 a somewhat modified form of coupling is shown. With this coupling or fitting, the flared out or flanged part 22 is continued completely around the fitting as indicated at $22^a$. This permits a plastic compound to be poured in the set screw hole at the top and to flow around the groove in the fitting and to seal the fitting against the entrance of moisture. With such a construction, the set screw 14 at times can be omitted and sealing of the fitting against moisture can be secured by pouring molten lead or similar low melting point metal into the groove. If desired, the set screw can be used in addition to the molten metal and in lieu of molten metal a cement of any composition as would insure electrical continuity between the duct and the fitting could be poured into the groove and such composition when set would secure mechanical security.

The various fittings, couplings, elbow parts, duct end blank and the like all are thus provided with means for uniting the fitting to a cooperating duct section or to another fitting. They are also all likewise provided with suitable means for variably supporting the fitting and the duct which is associated therewith at a proper and variable height above the base supporting slab 12.

What I claim is:

1. In a conduit system for electrical distribution having fittings adapted for association with the conduits, each fitting comprising in combination, means for receiving and holding a conduit, and means for variably adjusting and supporting the fitting at desirable variable heights above a supporting floor slab.

2. A fitting for an underfloor conduit system, said fitting having a female coupling to receive a cooperating conduit, said fitting further having a set screw with a conical end adapted to directly cooperate with a curved and rigid part of the conduit itself to clamp the same in the fitting.

3. The invention set forth in claim 2 in which a supplemental screw threaded stud is provided cooperating with the fitting and adapted for vertical adjustment to hold the fitting at a desired vertical height above a floor slab.

4. A fitting for an underfloor conduit system including a fitting having a female coupling to receive a conduit, an extension from said fitting having a threaded opening therein, said opening receiving a threaded stud which provides for an adjustable support for the fitting from a supporting floor slab.

5. A fitting for a conduit system comprising an elbow member provided with a female coupling for receiving a conduit, means for clamping the conduit in such coupling and means for variably supporting the elbow member and the conduit which is received therein at a desired variable height above a supporting floor slab.

6. A fitting for a conduit system comprising a member having a female coupling portion to receive a conduit and an extension upon said member adapted to receive a set screw and a set screw in said extension having a conical end adapted to bear at one side of the conical end directly upon a curved and rigid portion of a conduit which is telescoped into the female coupling.

7. A conduit system including a conduit section and a cooperating fitting and means for securing the same together comprising a set screw having a conical end portion to directly engage the curved portion of a rigid conduit to thereby tighten the conduit in the fitting and to tighten the screw in its hole by tilting it.

8. In a conduit system comprising a fitting and a rigid duct section, said fitting receiving the duct section and being provided with a set screw aperture and a set screw therein provided with an angled wedging portion cooperating directly with the rigid duct, said aperture, set screw and duct being so disposed that the set screw when tightened effects a lateral wedging action against the duct and also tilts the set screw to cause the latter to bind in its aperture in the fitting.

9. A conduit system including a fitting adapted to receive a rigid conduit section telescopically therein, said fitting having a flared out portion and a set screw having a conical end wedging portion adapted for extension into said flared out portion to engage the wedging portion of the set screw directly with the rigid corner portion of the rigid conduit and wedge the latter tightly in the fitting.

In testimony whereof I hereto affix my signature.

JAMES M. G. FULLMAN.